United States Patent
Jung et al.

(10) Patent No.: US 11,234,216 B2
(45) Date of Patent: *Jan. 25, 2022

(54) RESOURCE POOL SELECTING METHOD PERFORMED BY TERMINAL IN WIRELESS COMMUNICATION SYSTEM AND TERMINAL USING THE METHOD

(71) Applicant: LG ELECTRONICS INC., Seoul (KR)

(72) Inventors: Sunghoon Jung, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 44 days.

This patent is subject to a terminal disclaimer.

(21) Appl. No.: 16/582,098

(22) Filed: Sep. 25, 2019

(65) Prior Publication Data

US 2020/0022113 A1 Jan. 16, 2020

Related U.S. Application Data

(63) Continuation of application No. 15/519,001, filed as application No. PCT/KR2015/010858 on Oct. 14, 2015, now Pat. No. 10,470,162.

(Continued)

(51) Int. Cl.
*H04W 72/02* (2009.01)
*H04W 72/04* (2009.01)

(52) U.S. Cl.
CPC ........... *H04W 72/02* (2013.01); *H04W 72/04* (2013.01); *H04W 72/042* (2013.01); *Y02D 30/70* (2020.08)

(58) Field of Classification Search
CPC ............... H04W 72/02; H04W 72/042; H04W 8/005; H04W 68/005; H04W 4/06;
(Continued)

(56) References Cited

U.S. PATENT DOCUMENTS 9,198,162 B2    11/2015  Van Phan ............. H04W 72/04
9,578,667 B2 *   2/2017  Wei ..................... H04L 65/4076
(Continued)

FOREIGN PATENT DOCUMENTS

| KR | 1020100010927 A | 2/2010 |
| KR | 1020140098079 A | 8/2014 |
| WO |      14000205 A1 | 1/2014 |

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 8), 3GPP TS 36.304 V8.5.0.
Parent U.S. Appl. No. 15/519,001, filed Apr. 13, 2017.
U.S. Appl. No. 15/519,001, filed Apr. 13, 2017.

*Primary Examiner* — Hanh N Nguyen
(74) *Attorney, Agent, or Firm* — Dentons US LLP

(57) ABSTRACT

The present invention provides a device-to-device (D2D) operation method performed by a terminal in a wireless communication system, the method comprising the steps of: receiving, from a network, a configuration indicating at least one or more resource pool; receiving at least one or more index on each of the at least one or more resource pool; selecting, on the basis of the at least one or more index, one resource among the at least one or more resource pool; and performing direct communication through the selected resource pool, wherein the index is information indicating the usage of the at least one or more resource pool.

8 Claims, 15 Drawing Sheets

Related U.S. Application Data

(60) Provisional application No. 62/063,408, filed on Oct. 14, 2014.

(58) Field of Classification Search
CPC ............... H04W 76/042; H04W 72/10; H04W 76/02; H04W 76/14; H04W 52/10; H04W 52/245; H04W 36/30; H04W 76/04; H04W 68/00; H04W 40/24; H04W 72/04; H04L 47/70; H04L 65/4076; H04L 29/06; H04L 12/64; H04L 12/911
See application file for complete search history.

(56) References Cited

U.S. PATENT DOCUMENTS

| | | | |
|---|---|---|---|
| 9,693,338 B2 | 6/2017 | Zhao | H04W 72/04 |
| 9,973,916 B2* | 5/2018 | Niu | H04W 48/08 |
| 9,974,066 B2* | 5/2018 | Novlan | H04W 56/0015 |
| 10,009,712 B2* | 6/2018 | Gao | H04W 4/70 |
| 10,154,510 B2* | 12/2018 | Huang | H04W 4/80 |
| 10,327,229 B2* | 6/2019 | Zhao | H04L 5/0053 |
| 10,470,162 B2* | 11/2019 | Jung | H04W 72/04 |
| 10,631,223 B2* | 4/2020 | Adachi | H04W 76/11 |
| 10,897,787 B2* | 1/2021 | Chae | H04W 52/325 |
| 2007/0230477 A1 | 10/2007 | Worley | |
| 2013/0109301 A1 | 5/2013 | Hakola et al. | |
| 2015/0365941 A1* | 12/2015 | Liu | H04W 72/12 370/280 |
| 2018/0288685 A1 | 10/2018 | Jung | H04W 48/16 |

* cited by examiner

RESOURCE POOL SELECTING METHOD PERFORMED BY TERMINAL IN WIRELESS COMMUNICATION SYSTEM AND TERMINAL USING THE METHOD

CROSS-REFERENCE TO RELATED APPLICATIONS

This application is a Continuation Application of U.S. patent application Ser. No. 15/519,001, filed on Apr. 13, 2017, which is the National Stage filing under 35 U.S.C. 371 of International Application No. PCT/KR2015/010858, filed on Oct. 14, 2015, which claims the benefit of U.S. Provisional Application No. 62/063,408 filed on Oct. 14, 2014, the contents of which are all hereby incorporated by reference herein in their entirety.

BACKGROUND OF THE INVENTION

Field of the Invention

The present invention relates to wireless communications, and more particularly, relates to a method for a D2D operation performed by a terminal in a wireless communication system and a terminal using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, a network may broadcast information relating to a device-to-device (D2D) operation in a specific cell, for example, information to indicate resources for receiving a D2D signal. It is needed to specify how to operate when a terminal receives such information.

SUMMARY OF THE INVENTION

An object of the present invention is to provide a method for a D2D operation performed by a terminal in a wireless communication system and a terminal using the method.

In an aspect, a method for a device-to-device (D2D) operation performed by a user equipment (UE) in a wireless communication system is provided. The method comprises receiving a configuration indicating at least one resource pool from a network, receiving at least one index with respect to each of the at least one resource pool, selecting one resource pool among the at least one resource pool based on the at least one index and performing a direct communication through the selected resource pool, wherein the index is information indicating a use with respect to the at least one resource pool.

At least one index may include multiple indices.

The multiple indices may include a first index, and the first index may be information on whether the at least one resource pool is available to be used in a public safety UE (PS UE) or a non-public safety UE (non-PS UE), or both of the PS UE and the non-PS UE.

The first index may include a first bit and a second bit, The first bit may indicate that the at least one resource pool is available to be used in the public safety UE, and The second bit may indicate that the at least one resource pool is available to be used in the non-public safety UE.

The first index may include multiples codes, and wherein each of the multiples codes indicates that the at least one resource pool is available to be used in the public safety UE, the non-public safety UE, or both of the public safety UE and the non-public safety UE, respectively.

The multiple indices may include a second index, wherein the second index is information indicating a range classification allowed in the at least one resource pool.

The second index may be information on whether the at least one resource pool corresponding to the second index is used in a long range, a medium range or a short range.

The second index may be information indicating that the at least one resource pool corresponding to the second index is used in a long range and a medium range.

The second index may be information indicating that the at least one resource pool corresponding to the second index is used in a long range, a medium range and a shout range.

The multiple indices may include a third index, and wherein the third index is information for distinguishing a coverage classification allowed in the at least one resource pool.

The third index may be information on whether the at least one resource pool corresponding to the third index is used in an in-coverage, an out-of-coverage, or both of the in-coverage and the out-of-coverage.

The at least one index may be a single index.

In selecting one resource pool among the at least one resource pool, the UE may select the one resource pool using an RSRP measurement.

In another aspect, a user equipment (UE) is provided. The UE comprises a radio frequency (RF) unit configured to transmit or receive a radio signal and a processor operatively connected to the RF unit, wherein the processor is configured to perform receiving a configuration indicating at least one resource pool from a network, receiving at least one index with respect to each of the at least one resource pool, selecting one resource pool among the at least one resource pool based on the at least one index and performing a direct communication through the selected resource pool, wherein the index is information indicating a use with respect to the at least one resource pool.

Advantageous Effects

According to the present invention, a method for a D2D operation performed by a terminal in a wireless communication system and a terminal using the method are provided.

According to the present invention, a terminal may identify the use of each resource pool received from a network.

According to the present invention, by receiving the identification information that may distinguish the use of resource pool from a network, the terminal may identify the use of each resource pool.

According to the present invention, by receiving the identification information that may distinguish the use of resource pool from a network, a terminal may select the resource pool which is suitable for the use of the terminal. In this case, by selecting the resource pool which is suitable for the use of the terminal, the efficiency of the resource pool selection is increased, and the efficiency of the power management is increased. In addition, by selecting the resource pool suitable for the use of the terminal, a network may provide the most suitable service for the terminal efficiently, thereby the efficiency of the overall network operation being increased.

DESCRIPTION OF EXEMPLARY EMBODIMENTS

Figure 1:
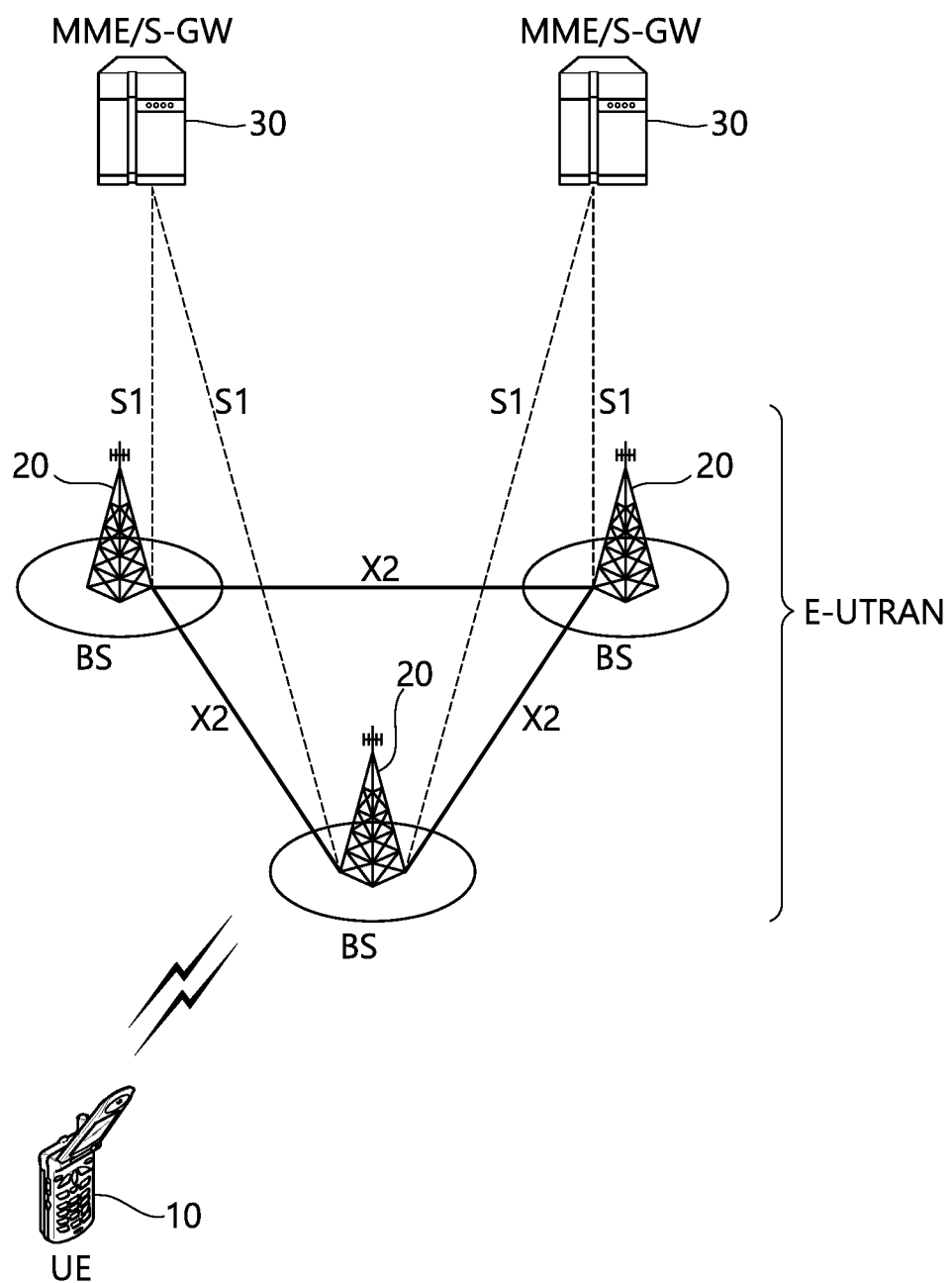
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
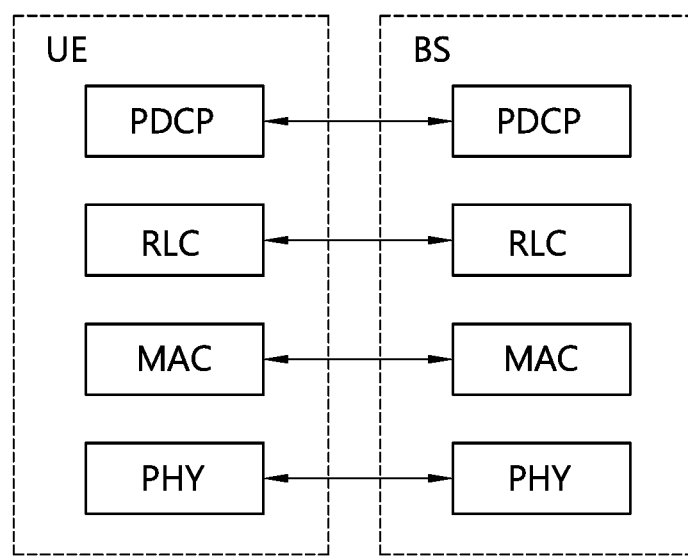
FIG. 2 is a diagram showing a wireless protocol architecture for a user plane.
Figure 3:
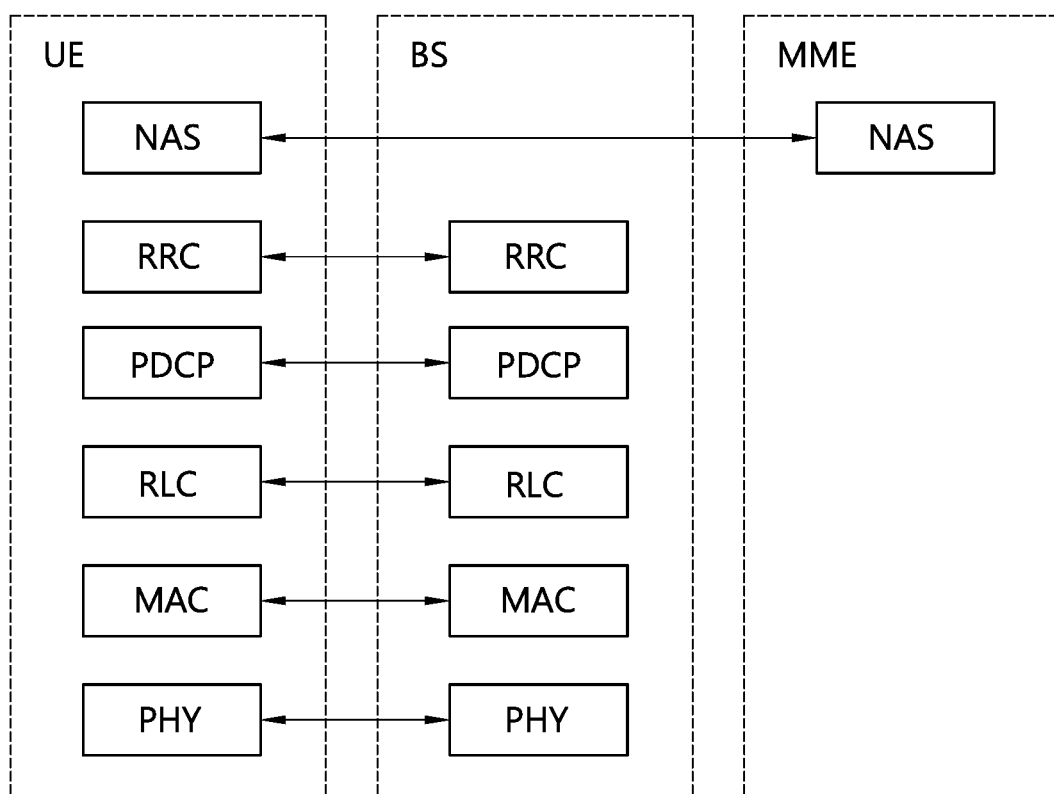
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS.

Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
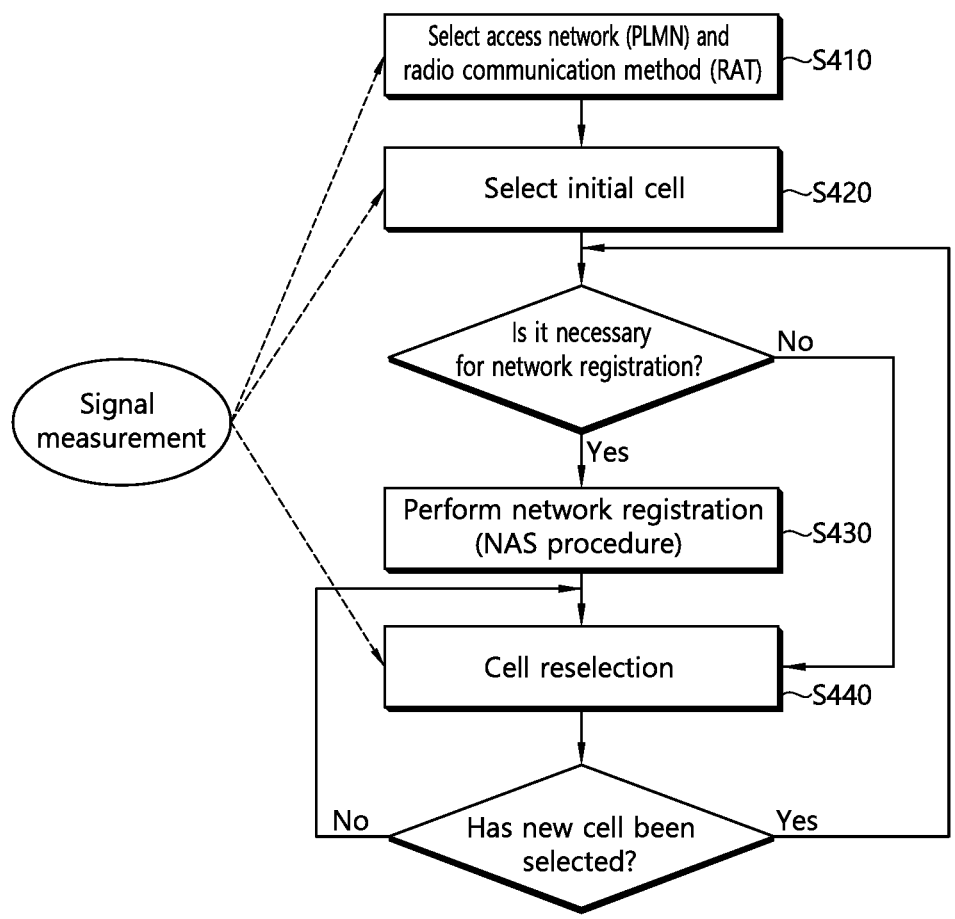
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
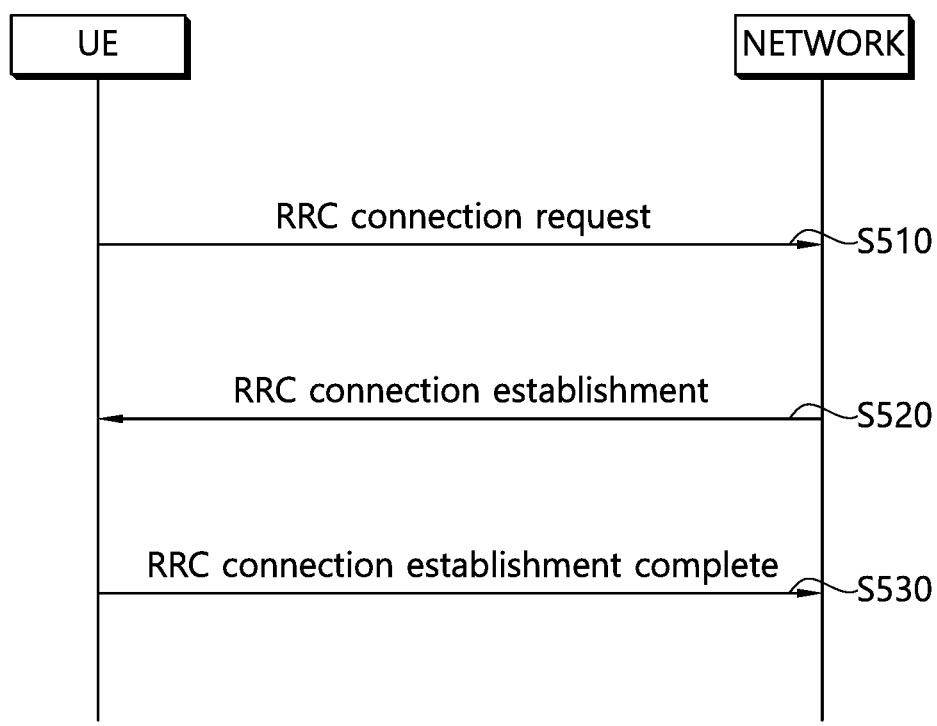
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
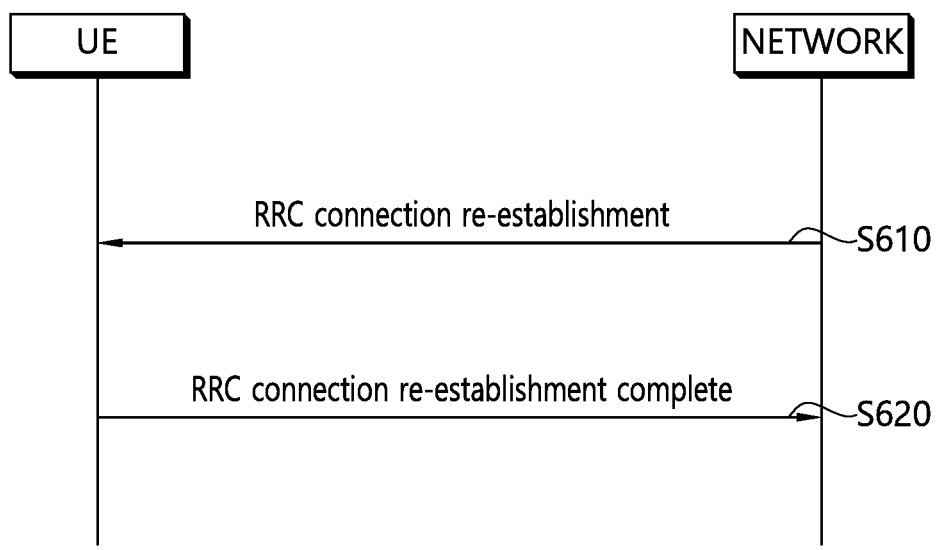
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$\text{Srxlev} > 0 \text{ AND Squal} > 0. \quad \text{[Equation 1]}$$

where:

$\text{Srxlev} = Qr_{xlevmeas} - (Q_{rxlevmin} + Q_{rxlevminoffset}) - P_{compensation}$, $\text{Squal} = Q_{qualmeas} - (Q_{qualmin} + Q_{qualminoffset})$ In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
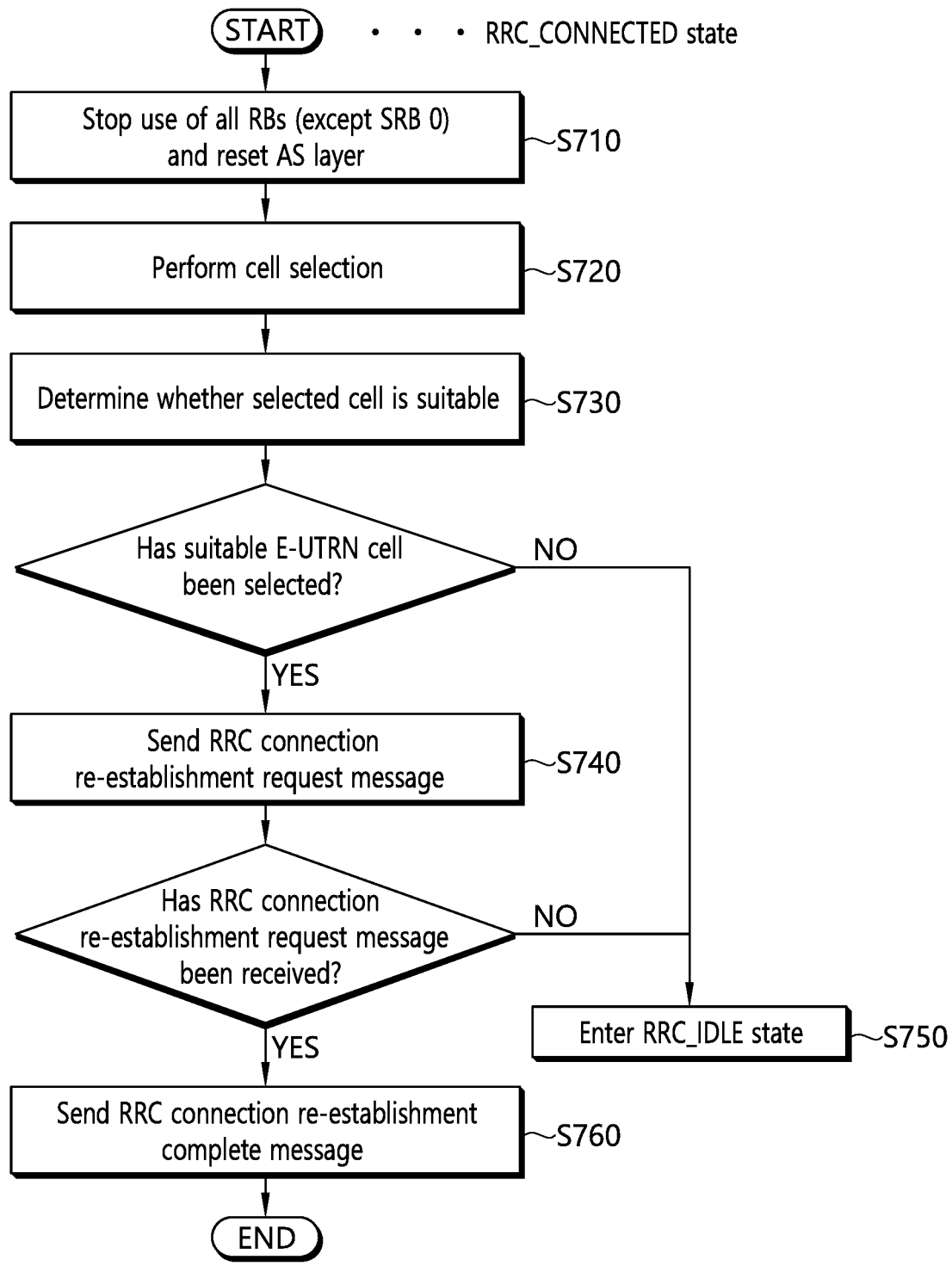
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
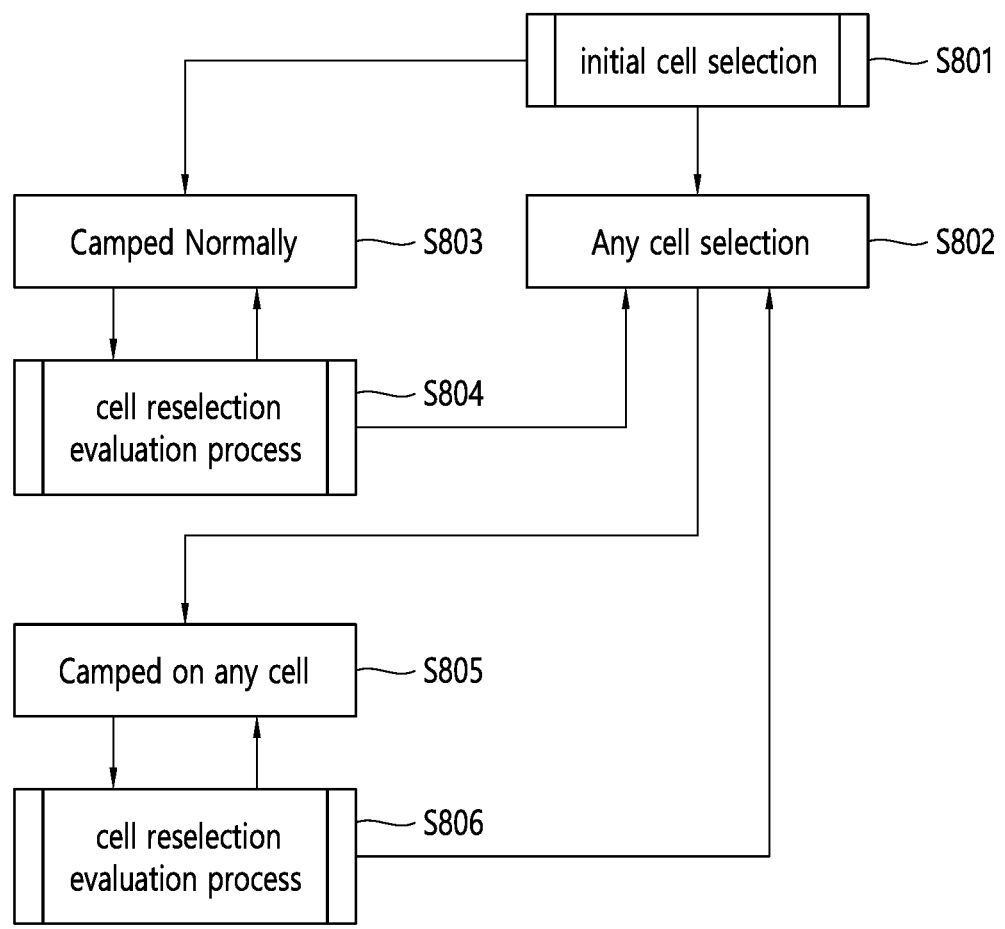
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
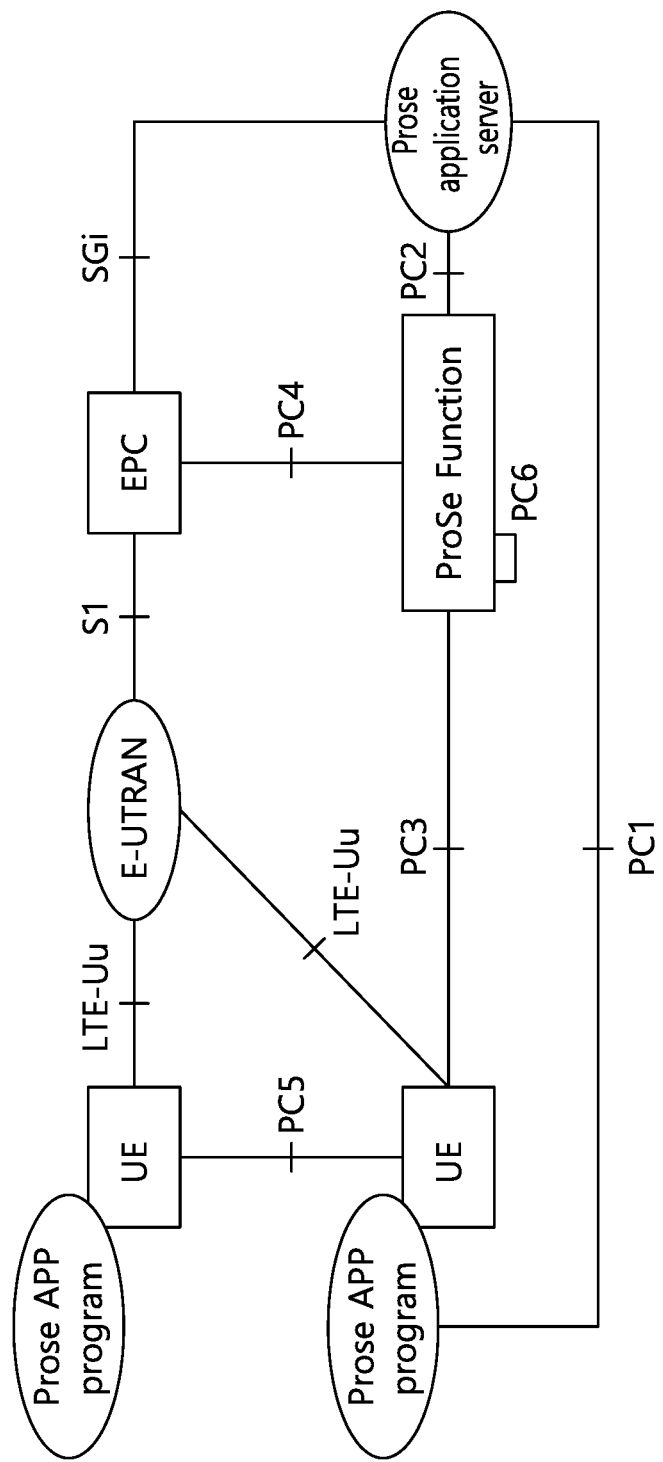
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
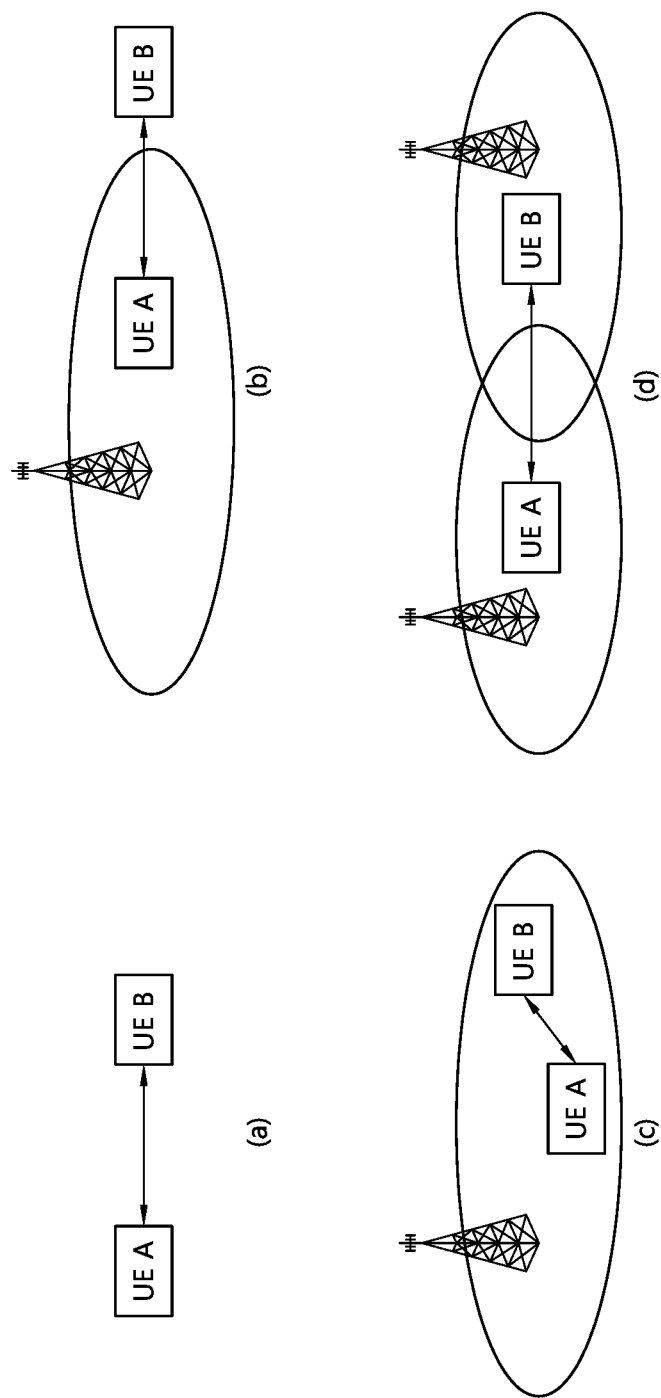
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
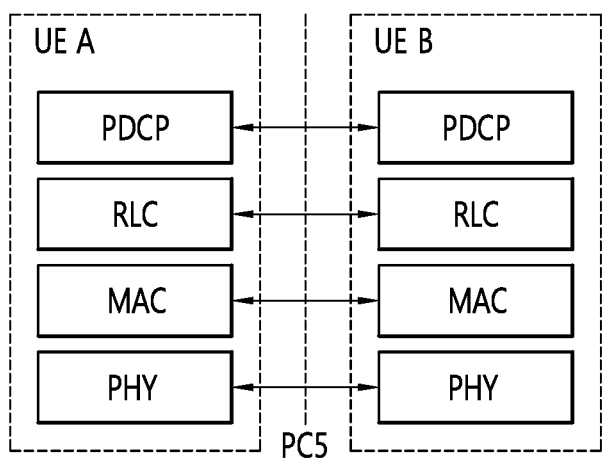
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
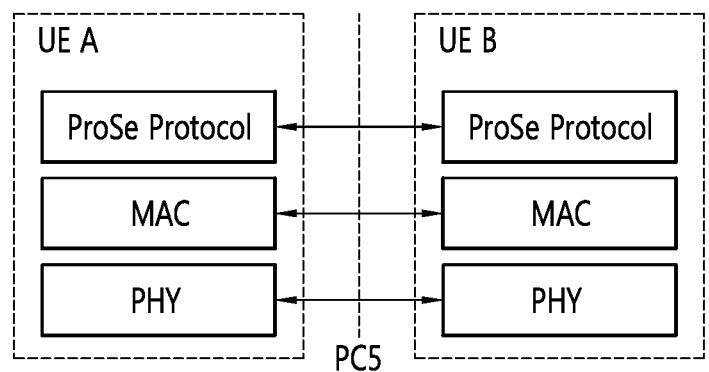
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention will be described in detail.

As described above, a UE selects a resource for performing a D2D direct transmission and reception in a resource pool. Here, the D2D direct transmission and reception may mean the D2D direct communication (e.g., ProSe direct communication) or the D2D direct discovery (e.g., ProSe direct discovery). When a UE selects a resource pool, since the UE is unable to the usage for each resource pool, it is hard for the UE to select the resource pool which is suitable for the use of the UE. Owing to this, the efficiency of the resource pool selection of a UE is decreased, and the efficiency of the power management of a UE is decreased. In addition, a UE is unable to select the resource pool suitable for the use, and a network is unable to provide the most suitable service for the UE efficiently, thereby the efficiency of the overall network operation being decreased.

Accordingly, the present invention, in order for a UE to distinguish the use of each resource pool acquired, proposes that a network provides the information for distinguishing the use of each resource pool. Through this, a UE may select the resource pool which is suitable for the use of the UE. For example, a network provides the information for distinguishing the use of the resource pool in the shape of an index, and a UE may select the resource pool which is suitable for the use of the UE by considering whether each resource pool supports the public safety UE and/or the non-public safety UE, the discovery range allowed for each resource pool, whether each resource pool supports the ProSe direct communication within coverage and/or outside the coverage, and the like, from the index. A UE selects the resource pool which is suitable for the use of the UE, and the efficiency of the resource pool selection is increased, and the efficiency of the power management is increased. In addition, a UE selects the resource pool suitable for the use of the UE, and a network may provide the most suitable service for the UE efficiently, thereby the efficiency of the overall network operation being increased.

Hereinafter, with reference to the drawings, the embodiments of the present invention will be described in detail.

Figure 13:
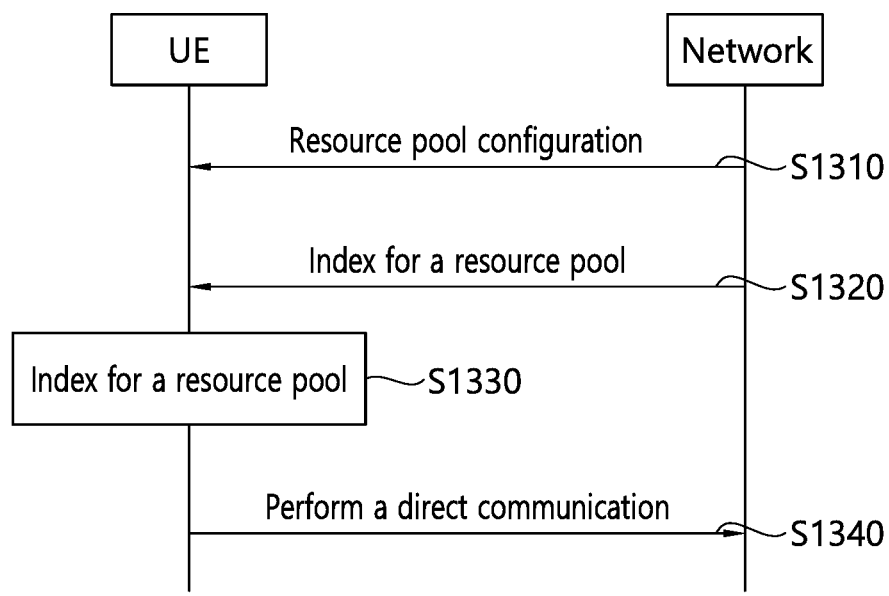
FIG. 13 illustrates a method for selecting a resource pool according to an embodiment of the present invention.

FIG. 13 illustrates a method for selecting a resource pool according to an embodiment of the present invention.

Referring to FIG. 13, a UE receives a resource pool from a network (step, S1310), and the UE may receive one or more resource pool. In this case, it is described that the UE receives the resource pool from the network for the convenience of description, but the UE may know the resource pool in advance.

The UE receives an index for the resource pool from the network (step, S1320), and the index that the UE receives may mean the information of a specific use of each resource pool that the UE receives. The UE may receive multiple indices and a single index from the network. Hereinafter, it will be described by distinguishing the case 1 that the UE receives multiple indices from the case 2 that the UE receives a single index.

1. The Case that a UE Receives Multiple Indices

One or more indices may be allocated to a single resource, and in this case, each index may indicate different uses for a resource pool. Hereinafter, particular examples of index that may be allocated to a resource pool will be described through examples of 1) a first index, 2) a second index and 3) a third index, respectively.

1) A First Index

A first index is expressed as a unit of bit or bit string, and in order for a UE to be allowed to select a specific resource pool, indicates the classification in which the UE is allowed to use a resource pool (e.g., public safety UEs, PS UEs and/or non-public safety UEs, non-PS UEs). That is, a network may transmit the information on whether each resource pool is available to be used in the public safety UEs, PS UEs and/or the non-public safety UEs, non-PS UEs to the network in the form of the first index. Otherwise, the network may indicate that each resource pool is available to be used for a specific use among the public safety UEs or the use of the public safety.

For example, the specific use among the public safety UEs or the use of the public safety of each resource pool may mean the communication use with a UE-to-Network relay or the discovery use of the UE-to-Network relay. In this case, the UE-to-Network relay provides the UE outside of the coverage of a BS with the connectivity with a network through a D2D direct communication link.

The detailed contents of the classification are as follows.

A resource pool restricted to the case equivalent to the direct communication for public safety UEs, PS UEs or the purpose of the public safety; or A resource pool restricted to the case equivalent to the direct discovery for public safety UEs, PS UEs or the purpose of the public safety; or A resource pool restricted to the relay direct communication for public safety UEs, PS UEs or the purpose of the public safety; or A resource pool restricted to the relay direct discovery for public safety UEs, PS UEs or the purpose of the public safety; or—A resource pool restricted to non-public UEs, non-PS UEs equivalent to the direct communication for public safety UEs, PS UEs and the purpose of the public safety or the purpose of the non-public safety; or A resource pool restricted to non-public UEs, non-PS UEs equivalent to the direct discovery for public safety UEs, PS UEs and the purpose of the public safety or the purpose of the non-public safety; or A resource pool restricted to non-public UEs, non-PS UEs equivalent to the direct communication for the purpose of the non-public safety.

A resource pool restricted to non-public UEs, non-PS UEs equivalent to the direct discovery for the purpose of the non-public safety.

The signaling method of the first index described above is as follows.

ABS may perform signaling a bit string that has the size of N to a UE. In this case, the Most Significant Bit (MSB), that is, the leftmost bit in a bit string that has the size of N may be indicated by index 1 and the higher region that has the size of M in the remainder of the bit string may be indicated by index 2.

A BS may perform signaling two fields to a UE. In this case, the BS may indicate a field by index 1 and indicate the remaining another field by index 2.

For example, in order to express the indices (i.e., index 1 and index 2), two bits may be used. One of the bits (hereinafter, bit 1) indicates whether a UE is allowed to use the corresponding resource pool for the purpose of the Public Safety (PS). The remaining another bit (hereinafter, bit 2) indicates whether a UE is allowed to use the corresponding resource pool for the purpose of the non-Public Safety (non-PS). Then, in order to express the indices, in the case that bit is as follows, {bit 1, bit 2}, {True, True} means that a UE is allowed to use the corresponding resource pool for the purpose of the Public Safety (PS) and a UE is allowed to use the corresponding resource pool for the purpose of the non-Public Safety (non-PS). Similarly, {True, False} means that a UE is allowed to use the corresponding resource pool for the purpose of the Public Safety (PS). In addition, {False, True} means that a UE is allowed to use the corresponding resource pool for the purpose of the non-Public Safety (non-PS).

For another example, in order to express the indices, only one index may be used. That is, a first code of the index may indicate the fact that a UE is allowed to use the corresponding resource pool for the purpose of the Public Safety (PS), and a second code of the index may indicate the fact that a UE is allowed to use the corresponding resource pool for the purpose of the non-Public Safety (non-PS). And, a third code of the index may indicate the fact that a UE is allowed to use the corresponding resource pool for the purpose of the Public Safety (PS) and for the purpose of the non-Public Safety (non-PS).

2) A Second Index

A second index is expressed as a unit of bit or bit string, and in order for a UE to be allowed to select a specific resource pool, indicates the range classification in which the UE is allowed to use a resource pool. The range classification is as follows.

Restricted to long range only: This may be indicated from the presence of the code (e.g., "long") that corresponds to the long range in a second index field. That is, in the case that the code, "long" is existed in the second index field, a UE may identify that the resource pool corresponding to the second index is used in the long range from the code.

Restricted to medium range only: This may be indicated from the presence of the code (e.g., "medium") that corresponds to the medium range in a second index field. That is, in the case that the code, "medium" is existed in the second index field, a UE may identify that the resource pool corresponding to the second index is used in the medium range from the code.

Restricted to short range only: This may be indicated from the presence of the code (e.g., "short") that corresponds to the short range in a second index field. That is, in the case that the code, "short" is existed in the second index field, a UE may identify that the resource pool corresponding to the second index is used in the short range from the code.

Medium range and long range: This may be indicated from the presence of the code (e.g., "medium") that corresponds to the medium range in a second index field. That is, in the case that the code, "medium" is existed in the second index field, a UE may identify that the resource pool corresponding to the second index is used in the long range as well as the medium range from the code. Or, in the case that i) the second index field includes the code (e.g., "medium") that corresponds to the medium range, and ii) a UE additionally receives the information (e.g., "Allowed for higher range classes") indicating that it is allowed to use the resource pool in the high discovery range class from a BS, a UE may identify that the resource pool corresponding to the second index is used in the long range as well as the medium range from the code.

Short range, medium range and long range: This may be indicated from the presence of the code (e.g., "short") that corresponds to the short range in a second index field. That is, in the case that the code, "short" is existed in the second index field, a UE may identify that the resource pool corresponding to the second index is used in the medium range and the long range as well as the short range from the code. Or, in the case that i) the second index field includes the code (e.g., "short") that corresponds to the short range, and ii) a UE additionally receives the information (e.g., "Allowed for higher range classes") indicating that it is allowed to use the resource pool in the high discovery range class from a BS, a UE may identify that the resource pool corresponding to the second index is used in the medium range and the long range as well as the short range from the code.

3) A Third Index

A third index is expressed as a unit of bit or bit string, and in order for a UE to be allowed to select a specific resource pool, indicates the coverage classification in which the UE is allowed to use a resource pool. The coverage classification is as follows.

In-coverage: A UE may identify that the resource pool corresponding to the third index may be used in the in-coverage from the third index. In this case, the in-coverage means that a UE is in the cell coverage.

Out-of-coverage: A UE may identify that the resource pool corresponding to the third index may be used in the out-of-coverage from the third index. In this case, the in-coverage means that a UE is out of the cell coverage.

In-coverage and out-of-coverage: A UE may identify that the resource pool corresponding to the third index may be used in both of the in-coverage and the out-of-coverage from the third index.

Table 2 below shows the detailed embodiments of the method for signaling the use of resource pool using the first index and the second index described above.

TABLE 2

| Type of resource pool | The first index | The second index | Use |
| --- | --- | --- | --- |
| Serving RX | PS only | N/A | Only the public safety UEs may use this RX resource pool for a direct communication. A UE may use this RX resource pool for a direct communication only for the purpose of the public safety. |
| Serving RX | Non-PS only | N/A | Only the non-public safety UEs may use this RX resource pool for a direct communication. A UE may use this RX resource pool for a direct communication only for the purpose of the non-public safety. |
| Serving TX | PS only | Long | Only the public safety UEs may use this RX resource pool for a direct communication together with the long range. A UE may use this RX resource pool for a direct communication together with the long range only for the purpose of the public safety. |
| Serving TX | Non-PS only | Medium | Only the non-public safety UEs may use this RX resource pool for a direct communication together with the medium range. A UE may use this RX resource pool for a direct communication together with the medium range only for the purpose of the non-public safety. |
| Serving TX | Non-PS only | Short | Only the non-public safety UEs may use this RX resource pool for a direct communication together with the short range. A UE may use this RX resource pool for a direct communication together with the short range only for the purpose of the non-public safety. |
| Neighbour cell#1 RX | PS only | N/A | Only the public safety UEs may use this RX resource pool for a direct communication. A UE may use this RX resource pool for a direct communication only for the purpose of the public safety. |
| Neighbour cell#1 RX | Non-PS only | N/A | Only the non-public safety UEs may use this RX resource pool for a direct communication. A UE may use this RX resource pool for a direct communication only for the purpose of the non-public safety. |
| Neighbour cell#2 RX | PS only | N/A | Only the public safety UEs may use this RX resource pool for a direct communication. A UE may use this RX resource pool for a direct communication only for the purpose of the public safety. |
| Neighbour cell#2 RX | Non-PS only | N/A | Only the non-public safety UEs may use this RX resource pool for a direct communication. A UE may use this RX resource pool for a direct communication only for the purpose of the non-public safety. |

In Table 2, "Serving RX" means the reception antenna of a serving cell, "Serving TX" means the transmission antenna of a serving cell, "Neighbour cell #1 RX" means the reception antenna of a first neighbouring cell, and "Neighbour cell #2 RX" means the reception antenna of a second neighbouring cell.

2. The Case that a UE Receives a Single Index

A UE may receive only one index that identifies the use of the resource pool from a network, and the detailed embodiment in this case is as represented in Table 3.

TABLE 3

| Index | Semantics #1: PS or non-PS | Semantics #2: Discovery range | Use |
|---|---|---|---|
| C | PS | Any | A UE may use the resource pool for the purpose of the public safety. |
| C + 1 | Non-PS | Any | Alt1) A UE may use the resource pool for the purpose of the non-public safety. Atl2) A UE may use the resource pool for the purpose of the public safety and the non-public safety. |
| Reserved region | | | |
| P | Any | Long | A UE may use the resource pool for the long range direct communication. |
| P + 1 | Any | Medium | A UE may use the resource pool for the medium range direct communication. |
| P + 2 | Any | Short | A UE may use the resource pool for the short range direct communication. |
| H + 1 | PS | Long | A UE may use the resource pool for the long range direct communication with respect to the purpose of the public safety. |
| H + 2 | PS | Medium | A UE may use the resource pool for the medium range direct communication with respect to the purpose of the public safety. |
| H + 3 | PS | Short | A UE may use the resource pool for the short range direct communication with respect to the purpose of the public safety. |
| N | Non-PS | Long | A UE may use the resource pool for the long range direct communication with respect to the purpose of the non-public safety. |
| N + 1 | Non-PS | Medium | A UE may use the resource pool for the medium range direct communication with respect to the purpose of the non-public safety. |
| N + 2 | Non-PS | Short | A UE may use the resource pool for the short range direct communication with respect to the purpose of the non-public safety. |

In Table 3, "Semantics #1" represents the information of the public safety or the non-public safety, and "Semantics #2" represents the information of the direct communication range.

In the case 1 that a UE receives multiple indices and the case 2 that a UE receives a single index, the additional embodiment that may be applied to the public safety UE and the non-public safety UE is as follows.

<Differentiation of the Public Safety UE/the Non-Public Safety UE>

A Non-Access Stratum (NAS) of a UE may determine whether the UE is the public safety UE or the non-public safety UE. The NAS of a UE may indicate (e.g., indicate the selection of a resource pool) the determination to an Access Stratum (AS) of the UE. This means the differentiation of individual UEs. When a network distinguishes the access control parameter for the public safety UE and the access control parameter for the non-public safety UE, and broadcasts them through the system information, the public safety UE performs the access control using the access control parameter for the public safety UE. For example, a separate parameter that the public safety UE applies for an Access Class Barring parameter may be provided to a UE.

In the case that a UE is in relation to a Normal access class (the range between 0 and 9), the UE may be regarded as the non-public safety UE. In the case that a UE is in relation to a Special access class (the range between 11 and 15), the UE may be regarded as the public safety UE.

When the higher layer of a UE request the direct communication to an Access Stratum (AS) of the UE, the NAS of the UE may indicate whether the direct communication is in relation to the public safety or the non-public safety. Or, when the higher layer of a UE request the announcement of a discovery signal to an Access Stratum (AS) of the UE, the NAS of the UE may indicate whether the discovery signal is in relation to the UE-to-Network relay discovery or other purpose. That is, the higher layer may request the discovery announce to the AS of the UE. In this case, the higher layer may be a Non-Access Stratum (NAS) or a ProSe protocol layer. The classification of whether the discovery signal is for the public safety or the non-public safety, whether the discovery signal is for UE-to-Network relay discovery or other purpose may mean the differentiation of the individual Prose Application Codes. In this case, it is available to indicate the differentiation of the individual Prose Application Codes to the UE AS continuously through the classification of a ProSe discovery session.

In the embodiment, the method is proposed for indicating whether the radio resource pool is for the purpose of the public safety, the non-public safety or other purpose described above through the indices related to each pool. As a simpler method for classifying whether the resource pool is for the purpose of the public safety or the non-public safety, when a network broadcasts a resource pool, it is available for a UE to use the pool fit for purpose by signaling the resource pool in relation to the public safety and the resource pool in relation to the non-public safety separately, but by signaling such that the resource pools of different uses is distinguished by the names of different pools. For example, the resource pool in relation to the public safety may be named a first resource pool and the resource pool in relation to the non-public safety may be named a second resource pool. In this case, the first resource pool and the second resource pool may have the names of different pools, and the first resource pool and the second resource pool may be separately signaled.

Likewise, in order to distinguish whether the radio resource pool is for the UE-to-Network relay or other use, when a network broadcasts a resource pool, it is available for a UE to use the pool fit for purpose by signaling the pool in relation to the UE-to-Network relay and the pool of other use separately, but by signaling such that the resource pools of different uses is distinguished by the names of different pools. For example, the pool in relation to the UE-to-Network relay may be named a first resource pool and the pool of other use may be named a second resource pool. In this case, the first resource pool and the second resource pool may have the names of different pools, and the first resource pool and the second resource pool may be separately signaled.

As an embodiment, a network may distinguish transmission resources for each use and perform signaling it to a UE, and a reception resource may perform signaling an integrated reception pool to a UE, not distinguishing the use. As a result of performing a transmission by selecting the resource suitable for a use by a UE through this method, the transmission quality for each use may be guaranteed, and the data transmitted by other UE may be received without being missed.

<Other Cases>

When a public safety UE applies the indices with respect to the resource pools signaled, the public safety UE is allowed to ignore the information (e.g., the second index in the case that a UE receives multiple indices described above) in relation to the direct communication (e.g., discovery range). This may be identically applied to the UE for the direct communication (e.g., announcement of a discovery signal) with respect to the public safety UE and the purpose of the public safety.

In addition, the public safety UE is allowed to be applied to an open loop power control parameter. Furthermore, the public safety UE may not be applied to the open loop power control. For example, regardless of the measured path loss, a UE may guess the value of a fixed power when determining the transmission power for a direct communication (e.g., discovery announcement). This may also be applied to the direct communication (e.g., announcement of a discovery signal) with respect to the purpose of the public safety.

The UE selects a resource pool based on the received index (step, S1330). More particularly, after the UE compares the use of the resource pool indicated by an index and the use that the UE is going to use, the UE selects the resource pool that provides the use that the UE is going to use.

In the case that an index indicating a specific use is identically set to each of the multiple resource pools, the UE set a higher RSRP value and a lower RSRP value for each of the resource pools, and after increases as much as 10 dB in the interval of {−infinity, −110 . . . −60, +infinity} dBm for each of the values. When the UE is unable to select a suitable resource pool even through the RSRP measurement described above, the UE may randomly select the resource pool among the resource pools that satisfy the power configuration between the UE and the network.

Later, based on the selected resource pool, the UE performs a direct communication (step, S1340). The detailed method for performing the direction communication based on the selected resource pool is as described above.

Figure 14:
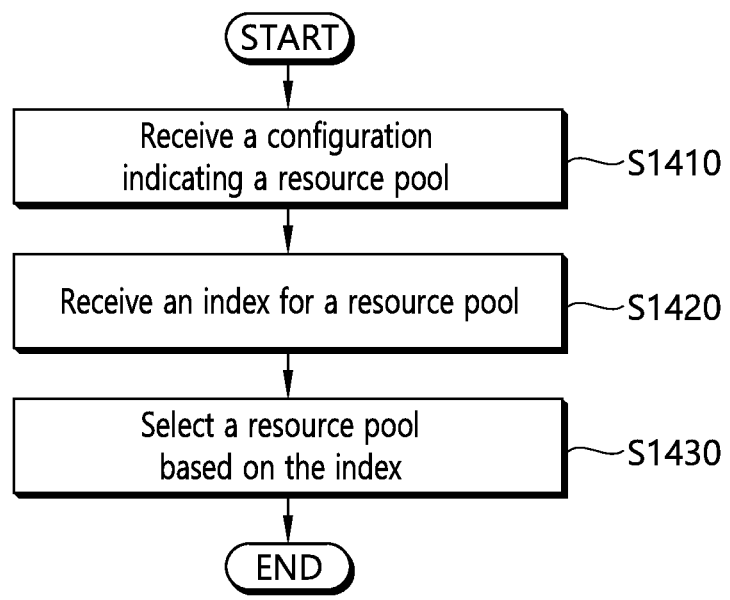
FIG. 14 is a flowchart illustrating a method for selecting a resource pool according to an embodiment of the present invention described above.

FIG. 14 is a flowchart illustrating a method for selecting a resource pool according to an embodiment of the present invention described above.

Referring to FIG. 14, a UE receives a configuration for a resource pool from a network (step, S1410). In this case, the detailed contents for receiving the resource pool from the network are as described above.

The UE receives an index with respect to the resource pool from the network (step, S1420). The detailed contents that the UE receives the index with respect to the resource pool from the network are as described above. In the embodiments described above, the step for the UE to receive the resource pool from the network and the step for the UE to receive the index with respect to the resource pool from the network are separately described, but the steps described above may be performed as one step. That is, the UE may also receive the resource pool and the index with respect to the resource pool at the same time from the network.

The UE selects a resource pool suitable for the use of the UE based on the received index (step, S1430). The detailed contents that the UE selects the resource pool suitable for the use of the UE based on the received index are as described above.

Figure 15:
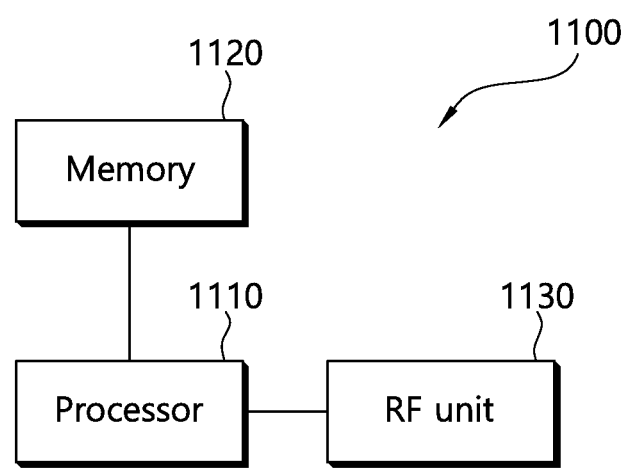
FIG. 15 is a block diagram illustrating a UE in which the embodiments of the present invention are implemented.

FIG. 15 is a block diagram illustrating a UE in which the embodiments of the present invention are implemented.

Referring to FIG. 15, a UE 1100 includes a processor 1110, a memory 1120 and a radio frequency (RF) unit 1130. The processor 1110 implements the proposed functions, processes and/or methods. For example, the processor 1110 may receive a resource pool from a network through the RF unit 1130, and receive an index with respect to the resource pool from a network.

In addition, the processor 1110 may select a resource pool based on the received index.

Furthermore, the processor 1110 may perform a direct communication based on the selected resource pool through the RF unit 1130.

The RF unit 1130 is connected with the processor 1110, and transmits and receives radio signals.

The processor 1130 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

What is claimed is:

1. A method for device to device (D2D) operation in a wireless communication system, the method performed by a user equipment (UE) and comprising:
   receiving, from a network, resource pool information including at least one resource pool;
   wherein the at least one resource pool includes a specific resource pool;
   receiving, from the network, first index information, second index information and third index information,
   wherein each of the first index information, the second index information and the third index information is information for the specific resource pool; and
   performing the D2D operation on the specific resource pool the first index information, the second index information and the third index information,
   wherein the first index information identifies whether the specific resource pool is available to be used for a specific usage among public safety usages,
   wherein the specific usage is for discovery of relaying between another UE and the network,
   wherein the other UE is located outside of a coverage area of the network,
   wherein the second index information identifies whether the specific resource pool is used for a long range, a medium range, or a short range,
   wherein the UE receives higher range allow information indicating whether the UE is capable of using a higher discovery range class, additionally,
   wherein, when the higher range allow information indicates that the UE is capable of using the higher discovery range class and when the second index information indicates a specific range among the long range, the medium range and a short range, and the specific resource pool is used for at least one range which is the same or higher than the specific range,
   wherein the third index information identifies which coverage is being used for the specific resource pool, and
   wherein, when the UE is a UE used for the public safety, the UE ignores the second index information.

2. The method of claim 1, wherein the D2D operation includes a D2D communication or a D2D Prose discovery.

3. The method of claim 2, wherein the D2D communication is a communication between the UE and the another UE.

4. The method of claim 2, wherein the D2D discovery is a procedure for discovering the another UE by the UE.

5. A user equipment (UE) for device to device (D2D) comprising:
   a transceiver; and
   a processor, operatively connected to the receiver and transmitter, wherein the processor is configured to:
   control the transceiver to receive, from a network, resource pool information including at least one resource pool;
   wherein the at least one resource pool includes a specific resource pool;
   control the transceiver to receive, from the network, first index information, second index information and third index information,
   wherein each of the first index information, the second index information and the third index information is information for the specific resource pool; and
   perform the D2D operation on the specific resource pool based on the first index information, the second index information and the third index information,
   wherein the first index information identifies whether the specific resource pool is available to be used for a specific usage among public safety usages,
   wherein the specific usage is for discovery of relaying between another UE and the network,
   wherein the other UE is located outside a coverage area of the network,
   wherein the second index information identifies whether the specific resource pool is used for a long range, a medium range or a short range,
   wherein the UE receives higher range allow information indicating whether the UE is capable of using a higher discovery range class,
   wherein, when the higher range allow information indicates that the UE is capable of using the higher discovery range class and when the second index information indicates a specific range among the long range, the medium range and a short range, the specific resource pool is used for at least one range which is the same or higher than the specific range,
   wherein the third index information identifies which coverage is being used for the specific resource pool, and
   wherein, when the UE is a UE used for the public safety, the UE ignores the second index information.

6. The UE of claim 5, wherein the D2D operation includes a D2D communication or a D2D discovery.

7. The UE of claim 6, wherein the D2D communication is a communication between the UE and the another UE.

8. The UE of claim 6, wherein the D2D discovery is a procedure for discovering the another UE by the UE.

* * * * *